United States Patent [19]
Prisco et al.

[11] 4,024,892
[45] May 24, 1977

[54] VALVE FOR USE IN A NUT INSTALLATION TOOL

[75] Inventors: Robert C. Prisco, Anaheim; Paul D. Myers, Fullerton, both of Calif.

[73] Assignee: Microdot, Inc., Greenwich, Conn.

[22] Filed: Mar. 8, 1976

[21] Appl. No.: 664,653

[52] U.S. Cl. .................. 137/630.14; 91/31; 137/637.2; 173/169
[51] Int. Cl.² ............................................. F16K 11/14
[58] Field of Search ........ 137/629, 630.14, 630.15, 137/599.2, 637.2; 91/31; 173/169

[56] References Cited

UNITED STATES PATENTS

| | | | |
|---|---|---|---|
| 2,710,019 | 6/1955 | Reasoner | 137/630.15 X |
| 2,995,114 | 8/1961 | Starr | 91/31 |
| 3,326,240 | 6/1967 | McConnaughy | 137/630.14 X |
| 3,709,259 | 9/1973 | Hechler | 137/630.15 |

*Primary Examiner*—Robert G. Nilson
*Attorney, Agent, or Firm*—Harness, Dickey & Pierce

[57] ABSTRACT

A co-axial, dual trigger valve mechanism for use in a nut runner, said valve mechanism being of such a construction as to permit low air flow initially so as to deliver only minimum acceptable torque to the nut with the result that the tool is caused to stall out at this low flow in cases where the nut has been properly pre-crimped and then upon further depression of the trigger full air flow will result causing the nut to be fully and properly installed. Conversely, if the nut has not been properly pre-crimped, the initial depression at the low pressure will cause the nut to be fully run all the way down thus indicating to the operator that the nut is improper and must be removed and replaced.

3 Claims, 8 Drawing Figures

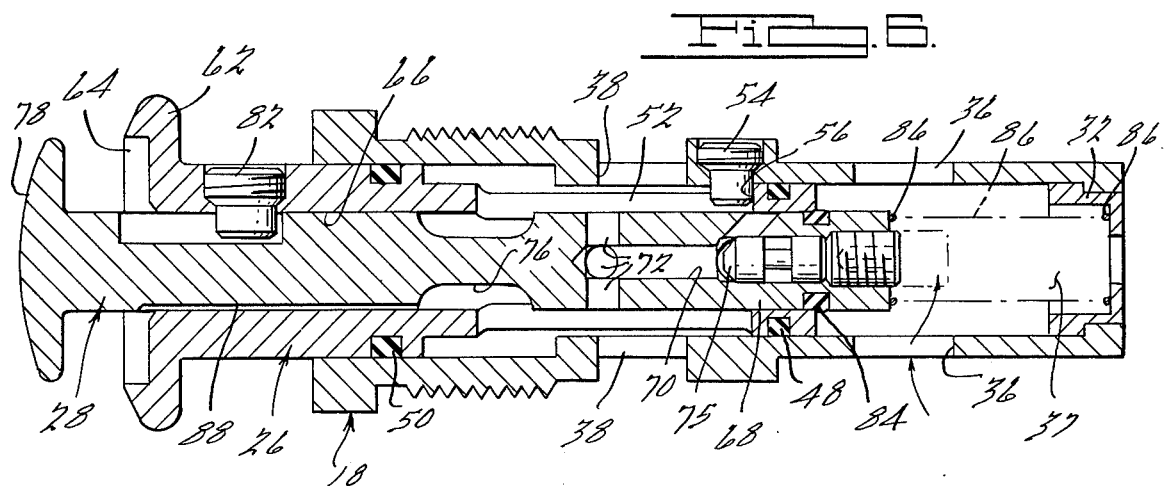
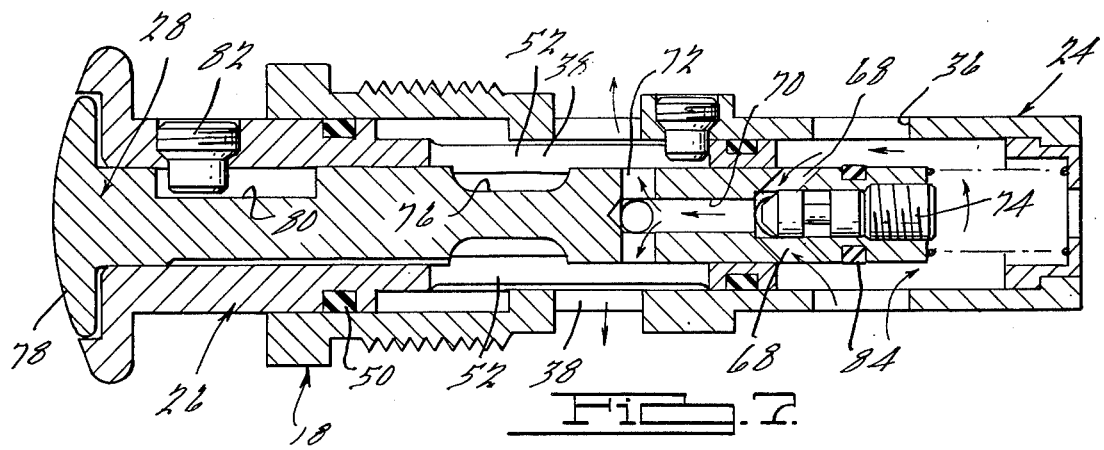
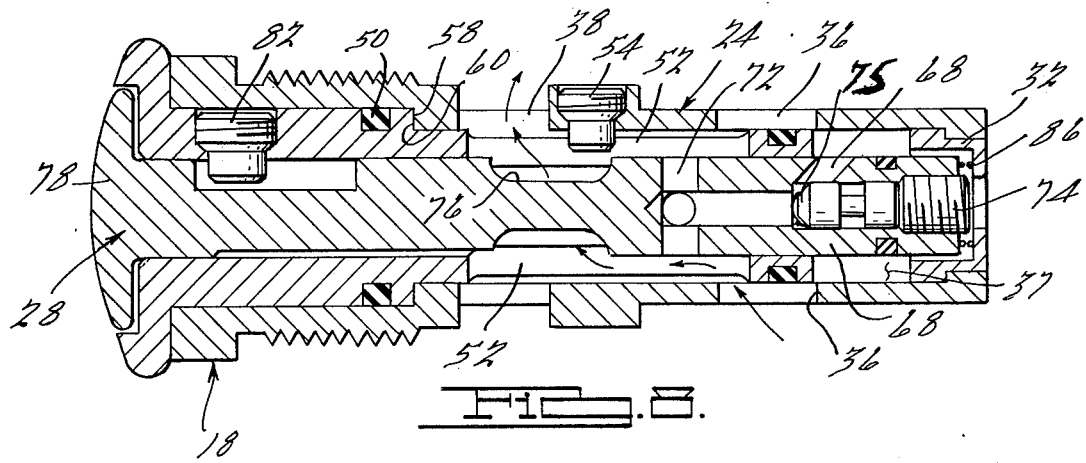

VALVE FOR USE IN A NUT INSTALLATION TOOL

BACKGROUND OF THE INVENTION

In installing torque prevailing nuts of the type that are pre-crimped with the usual power tool or nut runner, it is possible to install an occasional nut which has either too little self-locking torque or none at all. To prevent such improper installation going unnoticed, a power installation tool is needed to immediately signal the operator that the nut has less locking torque than is acceptable. Such improper nut can then be removed and a proper one installed.

SUMMARY OF THE INVENTION

According to the present invention, a torque-indicating dual-trigger valve mechanism is provided for use with a conventional air power operated nut runner of the air-actuated type. The valve mechanism comprises three major components: a housing, and first and second co-axial elongated triggers disposed within the housing for longitudinal movement relative thereto. The construction is such that the first and second triggers are mounted for relative longitudinal movement with respect to each other.

The valve housing has longitudinally spaced inlet and outlet ports formed therethrough and the first of the triggers, which embraces the second trigger, has an elongated port which is communicable with the inlet and outlet ports of the housing or sleeve. The second trigger is slidably disposed within the first trigger and independently movable relative to the first trigger. The second trigger has restrictive ports formed adjacent the innermost end, and such restrictive parts are communicable with the inlet ports in the sleeve for the reception of air flow and also communicable with the outlet port in the sleeve for conveying such pressure to the operating mechanism of the tool housing. This restricted communication is established with the second trigger only when initially depressed so that restrictive air flow is provided through the restrictive port and into the operating tool. Means are provided for adjustably controlling this restricted air flow.

Further depression of the second trigger causes depression of the first trigger along with it. The second trigger has other passages longitudinally spaced from the restrictive ports which are then communicable with the inlet and outlet ports of the valve housing so that when in this depressed position of both the first and second triggers, full delivery of air flow is accomplished through the valve thus delivering full flow to the operation of the nut runner.

BRIEF DESCRIPTION OF THE DRAWINGS

FIG. 6 is a longitudinal cross-sectional view of a valve mechanism with the valve elements in the position shown in FIG. 1;

FIG. 7 is a view similar to FIG. 1 with one of the triggers depressed to permit the restrictive air flow only;

FIG. 8 is a similar view with both triggers fully depressed showing the valve elements in position to permit full flow therethrough.

DETAILED DESCRIPTION OF A PREFERRED EMBODIMENT

Figure 1:
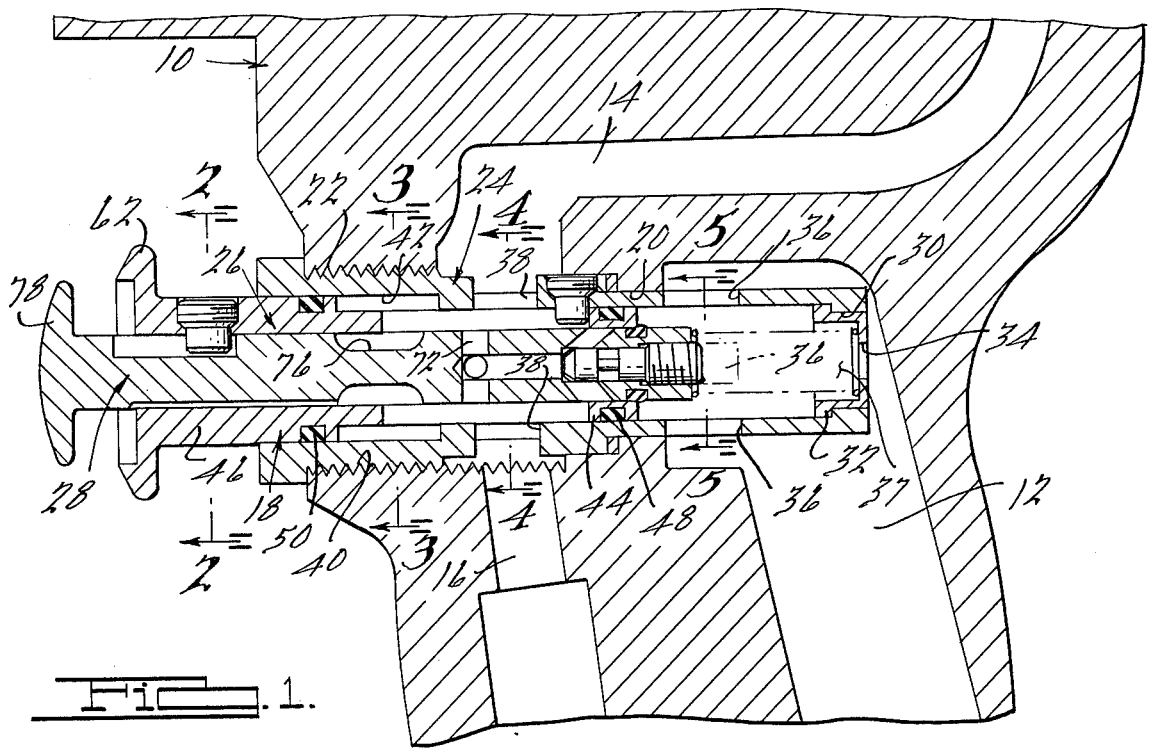
FIG. 1 is a partial cross-sectional view of a conventional air power operated nut runner having the valve mechanism of the present invention mounted therein and showing the valve mechanism in its free state and initial position of the valve triggers before operation or depression.

Referring to FIG. 1, a portion of a conventional power operated nut runner is generally indicated at 10. Such housing includes a passageway 12 which is connected to a suitable source of air pressure and which provides the pressure inlet chamber for the tool.

Passage 14 is also provided in the housing 10 which carries the air flow to the air motor which operates the nut runner.

A lubricating reserve chamber 16 is provided which is open to the valve for lubrication of the moving parts of the valve.

A dual trigger valve mechanism of the present invention is generally indicated at 18 and is disposed in a longitudinal bore through the housing, the inner portion of the bore being indicated at 20 and the outer portion of the bore being indicated at 22. Portion 22 is threaded for threadably receiving the valve mechanism 18 therewith. The bore communicates the inlet passage 12 and outlet passage 14 through the valve mechanism 18 as will be described hereinafter in detail.

The total valve mechanism 18 comprises three major elements: a housing or sleeve generally indicated at 24, a first trigger generally indicated at 26 and a second trigger generally indicated at 28.

The valve housing 24 has a second bore therethrough which slidably receives the first trigger 26 therein and the first trigger 26 has longitudinal bores which slidably receive the second trigger 28.

The inner end of the housing 24 has an opening 30 therein which receives a cup-shaped sleeve 32 therein. The sleeve 32 has an opening 34 so that an Allen key can be inserted through opening 34 to turn the air flow adusting screw. The sleeve 32 also forms a spring seat for a purpose that will be later described.

The housing 24 has a plurality of inlet ports 36 formed adjacent the inner end, there being four equally spaced in the embodiment illustrated. Longitudinally spaced from the outer ends of the ports 38, there also are four of such ports in the embodiment illustrated. The openings 34 and 36 assure pressurized air within the chamber formed in the inner end of the valve, i.e., the right end in the views shown.

Screw threads are provided at the outer ends of housing 24 as indicated at 40 so that the housing of the valve assembly may be threaded into threaded openings of the tool housing 10 in order to position the valve within the housing.

The bore through the housing has an enlarged annular diameter portion 42 adjacent the outer end.

The first trigger generally indicated at 26 is slidably disposed within the bore of the housing 24 and has a reduced peripheral portion 44 and a relatively enlarged peripheral portion 46 and is adapted to be slidably received within the small and large bore portions, respectively, of the housing 24. Seals 48 and 50 are provided to prevent escape of fluid pressure.

The trigger 26 is provided with elongated slots 52 therethrough, there being four of such slots in the embodiment illustrated. Such slots 52 provide communication with the outlet port 38.

Movement of the trigger 26 with respect to the housing is limited in its outermost or free position by a set screw 54 which is mounted in the housing 24 and disposed to project within one of the openings of the slots 52. This also prevents rotation of the trigger with respect to the housing 24. When in the outer or free position of the trigger 26, a shoulder 56 of one of the slots 52 abuts against the set screw 54. When in its innermost position, an annular shoulder 58 on the trigger 26 abuts against the adjacent annular shoulder 60 formed in the housing 24.

The trigger 26 is provided with an operating nob 62 on the outer end which is formed with an annular seat 64 in the outer face.

The second valve trigger 28 is slidably disposed within a bore 66 formed through the trigger 26.

The second trigger 28 is formed with restricting inlet passages 68 formed adjacent the inner end thereof, there being four of such inlet passages 68 in the embodiment illustrated.

A longitudinal bore 70 connects the restricting inlet passages 68 with restricting outlet passages 72 formed in the trigger 28. Adjusting screw 74 is threadably received in an opening through the innermost end of the trigger 28. The adjusting screw 74 has a conical inner end 75 which projects in the bore adjacent the innermost ends of the inlet passages 68 and adjacent the end of passage 70 so that by adjusting the screw 74, the air flow entering the restricting passage may be adjustably controlled and thus the air flow through passage 70 and outlet port 72 may be adjustably controlled.

The trigger 28 is formed with an elongated annular groove 76 which provides an inner communicating passageway between the inlet ports 36 and the outlet ports 38 of the housing through the elongated ports 52 of the trigger 26 when both triggers are fully depressed in the position shown in FIG. 8.

The trigger 28 is also formed with an operating nob 78 on the outer end which is adapted to seat within the seat 64 of the nob 62 when the trigger 28 is in the depressed position shown in FIGS. 7 and 8.

Longitudinal sliding movement of the trigger 28 with respect to trigger 26 is controlled and limited by means of a longitudinal slot 80 formed in the trigger 28. A set screw 82 is mounted through the wall of the trigger 26 when the inner end projects in the slot 80 to prevent rotation of the triggers 26 and 28 relative to each other and to limit longitudinal movement of the trigger 28.

An annular seal 84 is disposed adjacent the inner end of trigger 28 so as to seal air flow between the inner ends of the triggers 26 and 28.

The trigger 28 is resiliently urged to its outer free position by means of a coil spring 86 which has one end abutting against the adjacent inner end of the trigger 28 and the other end abutting against the seat of the sleeve spring seat 32.

Figure 2:
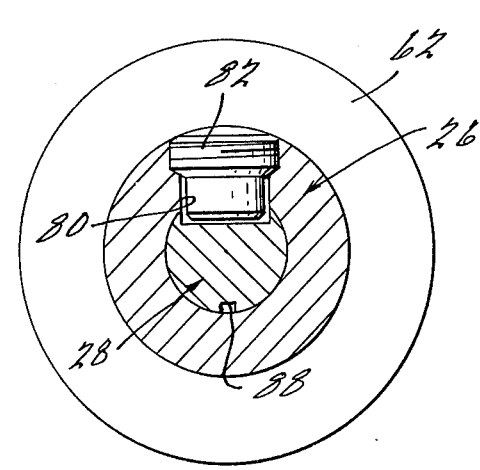
FIG. 2 is a cross-sectional view taken substantially along line 2—2 of FIG. 1.
Figure 3:
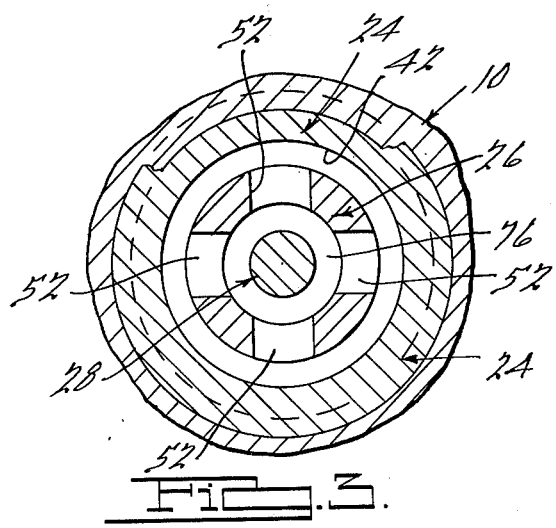
FIG. 3 is a cross-sectional view taken substantially along line 3—3 of FIG. 1.
Figure 4:
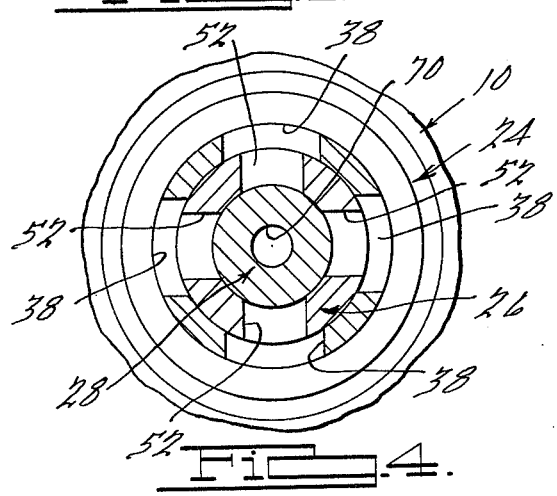
FIG. 4 is a cross-sectional view taken substantially along line 4—4 of FIG. 1.
Figure 5:
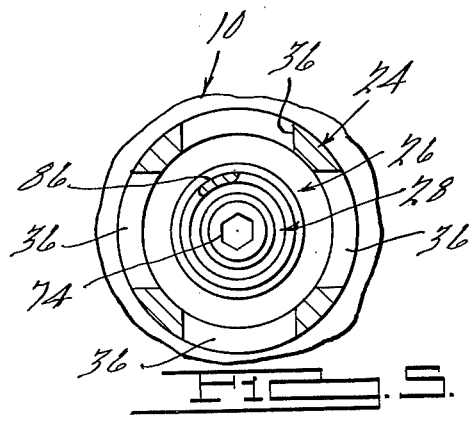
FIG. 5 is a cross-sectional view taken substantially along line 5—5 of FIG. 1.

A longitudinal vent slot 88 is formed on the trigger 28 so that when the trigger 28 is returned to its outermost position, as shown in FIG. 6 and also shown in FIG. 2, air pressure from the body of the tool is quickly vented prior to the next actuation of the tool. Trigger 28 is returned to its outer position through actuation of spring 86.

In operation of the above device, air under pressure is constantly provided through passage 12 and into the pressurized air chamber 37 adjacent the inner end of the valve assembly through ports 36 and 34. With the valve in the position shown in FIGS. 1 and 6, all air outlets of the valve are closed. When the valve trigger 28 is initially depressed by depressing the nob 78 to the position shown in FIG. 7, restricted air flow is provided from the pressurized air chamber 37 through restricting passages 68, 70 and 72 and out through passages 38. By adjustment of the needle valve 74, this low air flow through the air motor may be adjustably controlled. If an improper nut is applied, i.e., one that either has insufficient or no prevailing torque, this low pressure alone will run the nut to its full seated position and this signals to the operator that an improper nut has been used. That nut must be removed and a proper nut placed.

When a proper nut is driven, the low air flow through the restricted portions of the valve will not provide sufficient air flow to run the nut to its proper position and the air motor will stall.

In this case, the operator knows that a nut having proper torque prevailing characteristics is being installed.

A further depression of both triggers to the depressed position shown in FIG. 8 results in full air flow to the air motor and thus delivers pressure sufficient to torque the nut to its proper seat position. In this position of the valve as shown in FIG. 8, air flow from passage 12 enters ports 36, along passageway 52, around passage 76 and out through passageway 38 into the air passage 14 of the nut runner.

The valve triggers are returned to their initial position by first an initial unseating of the valve trigger 28 by the spring 86. Pressurized air may then enter pressure chamber 37 through openings 34 and 36 and acts on the inner end of the trigger 26 to move both triggers 26 and 28 to their initial positions shown in FIGS. 1 and 6. Any trapped air will be vented through vent 88.

What is claimed is:

1. A torque-indicating dual trigger valve mechanism for use with a power-operated nut runner of the air-actuated type comprising:
    an elongated sleeve forming a dual trigger housing, said sleeve having an elongated bore therethrough, inlet and outlet ports formed in said housing in longitudinally spaced relation;
    first and second co-axial elongated triggers disposed within said housing for longitudinal movement relative to said housing and with respect to each other;
    said first trigger embracing said second trigger and having an elongated port formed therein communicable with said inlet and outlet ports in said sleeve;
    said second trigger independently and slidably disposed within said first trigger, restrictive ports formed adjacent the inner end of said second trigger communicable with said inlet port in said sleeve and communicable with said outlet port in said sleeve through said elongated port in said first trigger when said second trigger only is in depressed position, means to adjustably restrict air flow through said restrictive ports;
    said second trigger having a passage spaced from said restrictive ports communicable with said inlet port and said outlet port when both first and second triggers are depressed to deliver full air flow through said outlet port.

2. A torque-indicating dual trigger mechanism according to claim 1 having resilient means to initiate movement of said second trigger to its initial position and port means communicable with air pressure to complete return of said first, and second triggers to their initial position.

3. A torque-indicating dual trigger mechanism according to claim 2 including means adjacent the outer end of said housing to vent pressure from said outlet port upon return of said triggers to their initial position.

* * * * *